J. S. & A. W. HOLTZCLAW.

HEMP BRAKE.

APPLICATION FILED APR. 18, 1917.

Reissued June 26, 1917.

14,323.

2 SHEETS—SHEET 1.

Inventors

J. S. HOLTZCLAW
A. W. HOLTZCLAW

By Watson E. Coleman

Attorney

THE NORRIS PETERS CO., PHOTO-LITHO., WASHINGTON, D. C.

J. S. & A. W. HOLTZCLAW.
HEMP BRAKE.
APPLICATION FILED APR. 18, 1917.
Reissued June 26, 1917.
14,323.
2 SHEETS—SHEET 2.
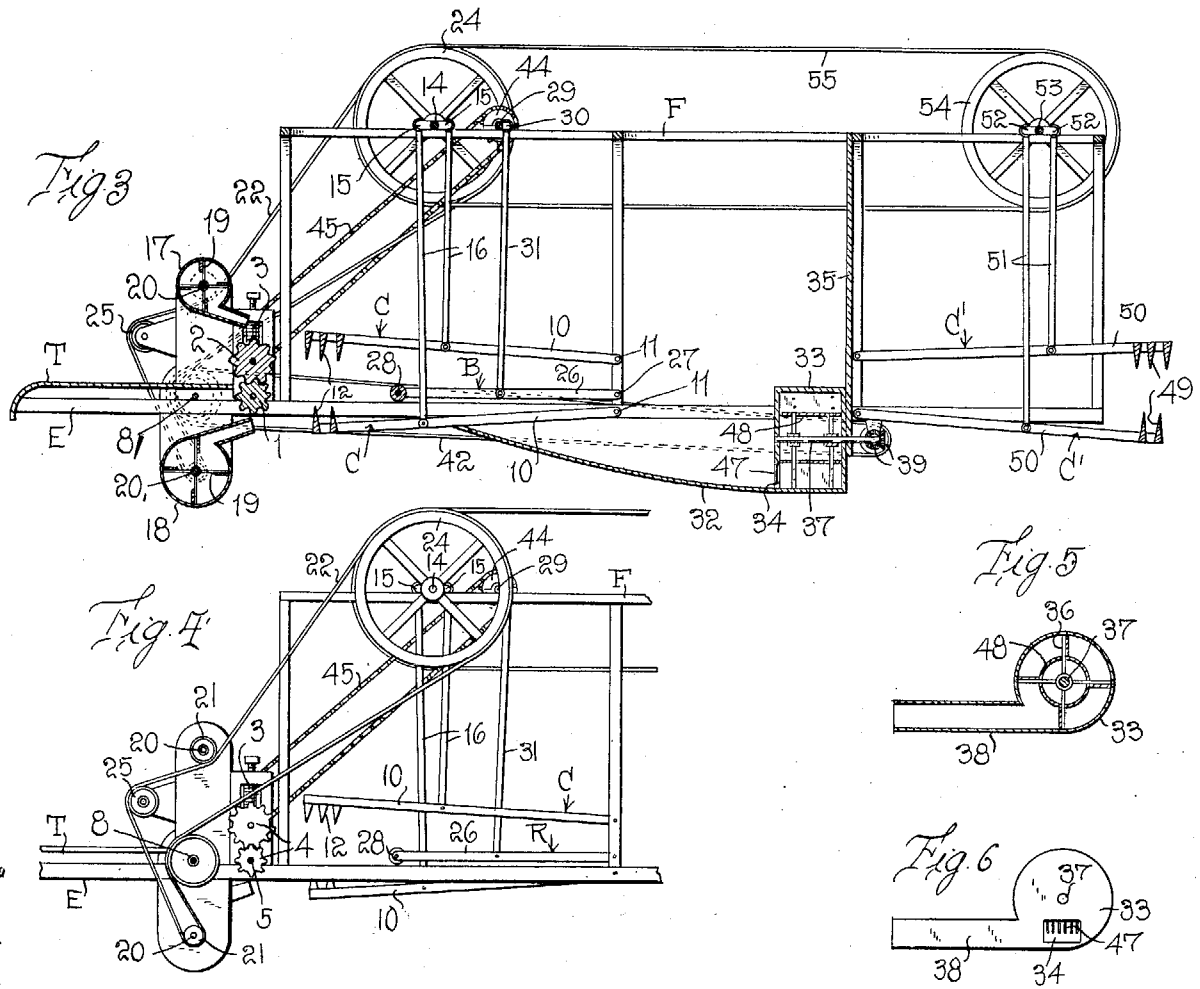
Inventors
J. S. HOLTZCLAW
+ A. W. HOLTZCLAW
By Watson E. Coleman
Attorney
THE NORRIS PETERS CO., PHOTO-LITHO., WASHINGTON, D. C.

UNITED STATES PATENT OFFICE.

JOHN SAM HOLTZCLAW AND AMBROS W. HOLTZCLAW, OF STANFORD, KENTUCKY.

HEMP-BRAKE.

14,323. Specification of Reissued Letters Patent. Reissued June 26, 1917.

Original No. 1,215,936, dated February 13, 1917, Serial No. 119,925, filed September 13, 1916. Application for reissue filed April 18, 1917. Serial No. 163,068.

*To all whom it may concern:*

Be it known that we, JOHN S. HOLTZCLAW and AMBROS W. HOLTZCLAW, citizens of the United States, residing at Stanford, in the county of Lincoln and State of Kentucky, have invented certain new and useful Improvements in Hemp-Brakes, of which the following is a specification, reference being had to the accompanying drawings.

This invention relates to certain improvements in hemp brakes and it is an object of the invention to provide a device of this general character having novel and improved means whereby the hemp is thoroughly loosened from the herds.

It is also an object of the invention to provide a novel and improved device of this general character including coacting rolls which serve to effectively mash and crack the herds and wherein the herds after passing between the rollers are operatively engaged by coacting choppers in order to loosen the hemp therefrom.

The invention also has for an object to provide a novel and improved device of this general character including a beater which is operated to strike the hemp and herds from below after the same have passed beyond the choppers to assure a further separation of the hemp.

The invention also has for an object to provide a novel and improved device wherein air currents are employed to assure the requisite rearward travel of the hemp.

The invention consists in the details of construction and in the combination and arrangement of the several parts of our improved hemp brake whereby certain important advantages are attained and the device is rendered simpler, less expensive and otherwise more convenient and advantageous for use, all as will be hereinafter more fully set forth.

The novel features of the invention will hereinafter be definitely claimed.

In order that our invention may be the better understood, we will now proceed to describe the same with reference to the accompanying drawings, wherein Figure 1 is a view in top plan of a hemp brake constructed in accordance with an embodiment of our invention;

Fig. 3 is a longitudinal vertical sectional view taken through the device as herein embodied, the side walls of the frame being omitted for clarity in disclosure;

Fig. 4 is a fragmentary view in elevation of the right hand side of the forward end portion of the brake as herein disclosed, the side wall of the housing being also omitted for purposes of disclosure;

Fig. 5 is a longitudinal vertical sectional view taken through the discharge fan for the herds as herein embodied; and Fig. 6 is a view in front elevation of said discharge fan.

Figures 1, 2:
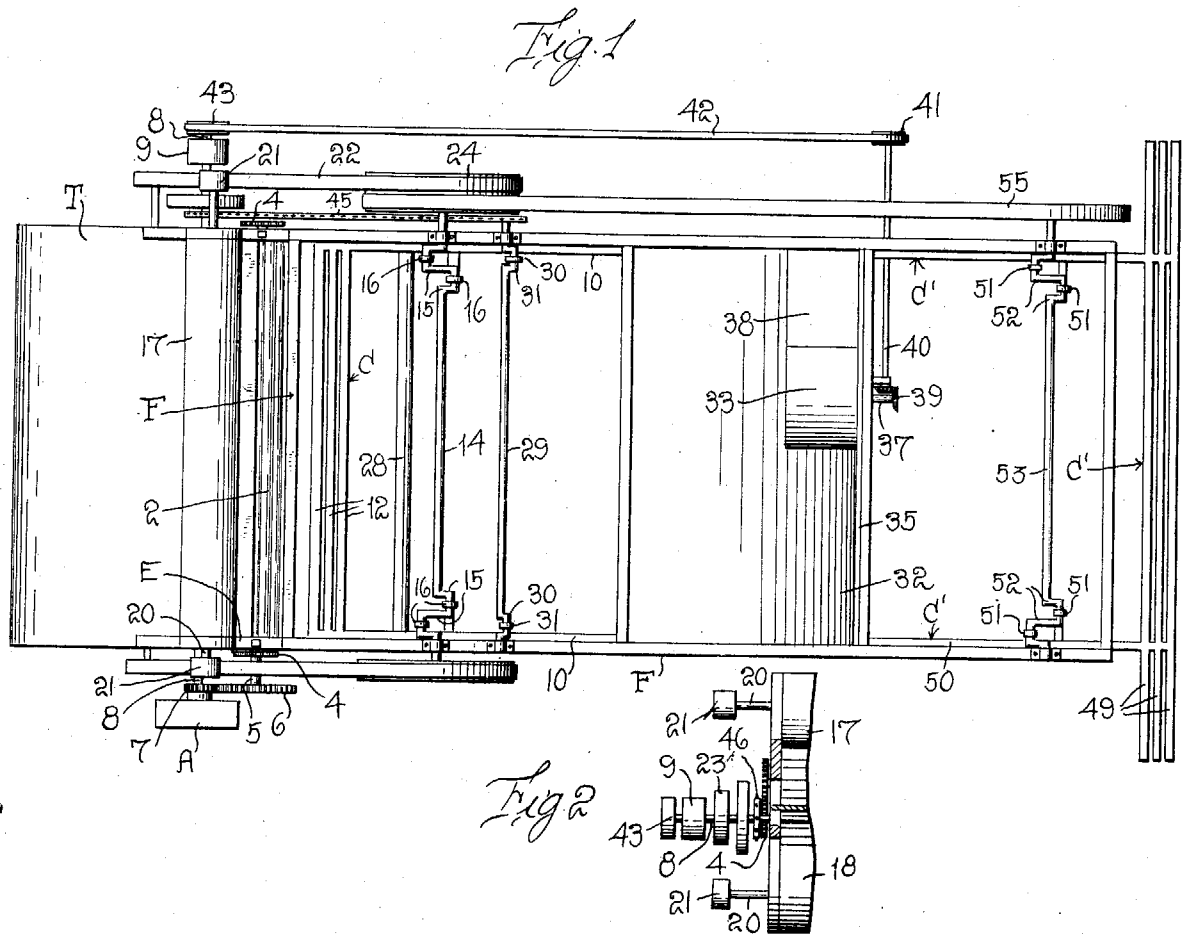
Fig. 2 is a fragmentary view partly in front elevation and partly in section of the left hand portion of the brake as herein set forth.

As disclosed in the accompanying drawings, F denotes a frame of predetermined dimensions and configuration and which is adapted to be supported in any desired manner. As the means for supporting the frame F forms no particular part of our present invention, a detail disclosure and illustration thereof is believed to be unnecessary.

The forward or entrance end of the frame F is provided with an extension E which supports the feed table T upon which the bundles or bunches of plants are initially positioned and which are forced thereover manually to pass between the rollers 1 and 2 arranged in vertical relation and preferably having their peripheries corrugated or fluted in order to facilitate their action on the plants passing therebetween, and it has also been found of manifest advantage to have the upper roller 2 of a diameter greater than the lower roller 1 as a greater leverage is afforded and thus breaking the hemp more thoroughly. It is also to be noted that the upper roller 2 is under spring pressure as indicated at 3, whereby the herds are thoroughly mashed and cracked.

Adjacent end portions of the rollers 1 and 2 are operatively connected, as at 4, and the lower roller 1 is provided with an extended shaft 5 provided with a gear 6 operatively engaged with the gear 7 coacting with the transmission indicated in its entirety as A, said transmission being driven by the main shaft 8. The shaft 8 is adapted to be driven in any desired manner and as disclosed in Fig. 1 is provided with the pulley 9 with which is adapted to coact a conventional belt leading from a suitable source of power.

The hemp after passing between the rollers 1 and 2 is operatively engaged by the choppers C, each of said choppers comprising a frame 10 pivotally engaged as at 11, with the frame F at a point intermediate its length and adapted for swinging movement in a vertical path, said frames 10 being in predetermined spaced relation. The forward ends of the frames 10 are provided with the transversely disposed swords 12 which are adapted to overlap when the frames 10 are in closed position.

14 denotes a shaft rotatably supported by the frame F at a point above the choppers C and intermediate the length of the frames 10, and said shaft is provided with the pairs of cranks 15, the cranks of each pair being reversely directed.

Operatively engaged with the cranks 15 are the pitmen 16 which are also operatively engaged with the frame 10 at a predetermined point inwardly of the swords 12 whereby it will be perceived that upon rotation of the shaft 14, the choppers C will be caused to swing or rock in unison but in reverse directions.

Positioned above and below the rollers 1 and 2 are the fan casings 17 and 18 which direct a blast or current of air rearwardly of the frame F and in a substantially converging line of travel whereby currents of air are engaged with the hemp from above and below and at a point rearwardly of the rollers 1 and 2, whereby said hemp is caused to travel rearwardly, said air currents also serving to maintain the hemp in vibration to facilitate a separation of the herds.

In practice it has been found that the swords 12 do not interfere with the effectiveness of these air blasts or currents, as the oscillating movement of the swords 12 is at such speed as to only obstruct the travel of the air for an instant during each stroke of the choppers C so that the current or flow of the air upon the hemp is substantially continuous.

The fans 19 arranged within the casings 17 and 18 have their shafts 20 extending beyond the opposite sides of said casings, and affixed to the projected portions thereof are the pulleys 21 with which coact the belts 22 which also pass over the pulleys 23 affixed to the main shaft 8 and around the pulleys 24 secured to the shaft 14, whereby it will be perceived that upon rotation of the shaft 8 the fans 19 and the shaft 14 are caused to rotate in unison with the shafts 20 rotating in opposite directions so that the air blasts or currents will be properly directed. It is also to be observed that the belts 22 pass around the idle pulleys 25 for a purpose which is believed to be clearly apparent to those skilled in the art to which our present invention appertains.

Attention is also directed to the fact that the pulleys 21 coacting with the fan 19 in the lower casing 18 are of a diameter less than the pulleys 21 coacting with the fan in the upper casing 17, whereby said lower fan 19 travels at a greater speed in order to overcome the effect of gravity of the hemp and thereby producing substantially a horizontal line of travel of said hemp. This increased force of blast or current is further assured by having the blades of the fan 19 in the lower casing 18 of a length greater than that of the blades of the fan coacting with the upper casing 17.

B denotes a beater comprising a frame 26 pivotally engaged with the frame F as at 27, and including at its forward portion the transversely disposed striker bar 28 which is adapted to engage the hemp from below whereby said hemp is further vibrated in order to assure the separation of the herds therefrom.

29 denotes a second shaft disposed transversely of the frame F at a predetermined point above the beater B and the choppers C and provided with the cranks 30 with which are operatively engaged the pitmen 31 also operatively engaged with the frame 26 of the beater B whereby said beater B may be caused to swing or oscillate in a vertical path in order to thoroughly vibrate or agitate the hemp passing thereover.

The herds separated from the hemp are collected within the pan or apron 32 disposed on a predetermined downward and rearward incline and said herds are drawn within the casing 33 through the entrance opening 34 therein. The casing 33 is disposed transversely of the frame F and is preferably supported by the partition 35 also extending transversely of the frame F, and mounted within said casing 33 is the fan 36 rotating around a horizontal axis as indicated by the shaft 37, whereby it will be perceived that the herds passing within the casing 33 are discharged to one side of the frame F through the exit or discharge spout 38.

As herein embodied, the shaft 37 is operatively engaged, as at 39, with the shaft 40 around which is disposed the belt 42 which is also directed around a pulley 43 fixed to the main shaft 8.

In practice the sides of the frame F in advance of the partition 35 are open so that the operators may readily remove the hemp as delivered beyond the choppers C and the beater B, as is believed to be clearly apparent.

As herein disclosed, the shaft 29 is provided with a gear 44 around which is directed the chain 45 which is also disposed around the sprocket 46 affixed to the main shaft 8, whereby it will be at once seen that the beater B is operatively driven from the shaft 8.

The entrance opening 34 of the casing 33 is partially intersected by the teeth or tines 47 which serve to prevent the entrance within said casing 33 of hemp in the event a bunch should get astray. It is also to be noted that the central portion of the fan 36 is provided with the cylindrical shield 48 which serves to prevent fragments of hemp from becoming entangled with the shaft 37 and which would otherwise materially interfere with the requisite operation of said fan.

Disposed rearwardly of the frame F are the supplemental choppers C′ which have the swords 49 thereof arranged rearwardly of said frame, and the frames 50 thereof have operatively engaged therewith the pitmen 51 which are also operatively engaged with the reversely directed cranks 52 carried by the shaft 53. The shaft 53 is provided with the pulley 54 around which passes the belt 55 which is also disposed around the pulley 24 suitably affixed to the shaft 14 hereinbefore referred to and whereby the choppers C′ are caused to swing or oscillate in unison but in reverse directions.

The choppers C′ are employed for finishing and dressing the hemp ready for knotting or baling and the hemp is operated, relative to the swords 49, by hand and it is for this reason the swords 49 are of material length so that several operators, preferably three, may work therewith.

From the foregoing description, it is thought to be obvious that a hemp brake constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice, except as hereinafter claimed.

We claim:

1. A hemp brake including, in combination, coacting rollers between which the hemp is adapted to pass, choppers positioned rearwardly of the rollers, a beater positioned rearwardly of the choppers, and means for creating air blasts to direct the hemp relatively to the choppers and the beater.

2. A hemp brake including, in combination, coacting rollers between which the hemp is adapted to pass, choppers positioned rearwardly of the rollers, a beater positioned rearwardly of the choppers, and means for causing air blasts to engage the upper and lower surfaces of the hemp to direct the hemp relative to said choppers and beater.

3. A hemp brake including, in combination, coacting rollers between which the hemp is adapted to pass, choppers positioned rearwardly of the rollers, a beater positioned rearwardly of the choppers, and means for causing air blasts to engage the upper and lower surfaces of the hemp to direct the hemp relative to said choppers and beater, the blast coacting with the under surface of the hemp being of greater force than the upper blast.

4. A hemp brake including, in combination, breaking means for the hemp, chopping means positioned rearwardly of the breaking means, and means for creating air blasts to direct the hemp relatively to the chopping means.

5. A hemp brake including, in combination, breaking means for the hemp, chopping means positioned rearwardly of the breaking means, and means for causing air blasts to engage the upper and lower surfaces of the hemp to direct the hemp relative to said chopping means.

6. A hemp brake including, in combination, breaking means for the hemp, chopping means positioned rearwardly of the breaking means, and means for causing air blasts to engage the upper and lower surfaces of the hemp to direct the hemp relative to said chopping means, one of said blasts being of greater force than the remainder of the blasts.

In testimony whereof we hereunto affix our signatures in the presence of two witnesses.

JOHN SAM HOLTZCLAW.
AMBROS W. HOLTZCLAW.

Witnesses:
M. C. Newland,
G. F. DeBorde.

Copies of this patent may be obtained for five cents each, by addressing the "Commissioner of Patents, Washington, D. C."